United States Patent
McFarland

(10) Patent No.: US 9,299,051 B2
(45) Date of Patent: Mar. 29, 2016

(54) METHODS AND SYSTEMS FOR EVALUATING THE PERFORMANCE OF BUILDING PROCESSES

(75) Inventor: Norman R. McFarland, Palatine, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 856 days.

(21) Appl. No.: 13/611,645

(22) Filed: Sep. 12, 2012

(65) Prior Publication Data

US 2014/0074867 A1   Mar. 13, 2014

(51) Int. Cl.
| | |
|---|---|
| G06F 17/30 | (2006.01) |
| G06Q 10/06 | (2012.01) |
| G05B 15/02 | (2006.01) |
| G05B 23/02 | (2006.01) |

(52) U.S. Cl.
CPC ............ G06Q 10/0639 (2013.01); G05B 15/02 (2013.01); G05B 23/0232 (2013.01); *G05B 2219/2642* (2013.01)

(58) Field of Classification Search
USPC .......................................... 707/687, 688, 689
See application file for complete search history.

(56) References Cited

U.S. PATENT DOCUMENTS

| | | | | |
|---|---|---|---|---|
| 6,304,594 | B1 * | 10/2001 | Salinger ............... | H04B 1/1027 375/222 |
| 7,921,085 | B2 * | 4/2011 | Guo .................. | G06F 17/30536 707/688 |
| 7,933,870 | B1 * | 4/2011 | Webster ............ | G06F 17/30174 707/638 |
| 2004/0102990 | A1 * | 5/2004 | Jones ................... | G06Q 10/063 705/7.26 |
| 2005/0235008 | A1 * | 10/2005 | Camping ............. | G06Q 10/087 |
| 2006/0248116 | A1 * | 11/2006 | Sobel ........................ | G06F 8/65 |
| 2009/0018996 | A1 * | 1/2009 | Hunt ..................... | G06Q 30/02 |
| 2010/0205042 | A1 * | 8/2010 | Mun ...................... | G06Q 10/06 705/59 |
| 2011/0246058 | A1 * | 10/2011 | Appel .................. | G07B 15/063 701/533 |
| 2012/0022902 | A1 * | 1/2012 | Gressel .................. | G06Q 10/02 705/5 |
| 2012/0029802 | A1 * | 2/2012 | Barry ..................... | G06Q 10/10 701/120 |
| 2012/0271809 | A1 * | 10/2012 | Lyon .................. | H04L 63/1408 707/706 |
| 2014/0085351 | A1 * | 3/2014 | Jung .................... | G09G 3/3426 345/690 |

* cited by examiner

*Primary Examiner* — Hosain Alam
*Assistant Examiner* — Ahmed Abraham

(57) ABSTRACT

Systems and methods generate a business process control chart and process report card. A method includes generating process control chart data for a building process. The method further includes generating a summary record of sample data from the control chart data. The method includes determining a process grade for each process using the summary record. The method further includes generating a process report card including the determined process grade for each process.

18 Claims, 11 Drawing Sheets

Composite list of aggregate grades by process type

| | |
|---|---|
| Room Temp | 75* |
| Room Air Flow | 95 |
| Boiler Temp | 93 |
| Chiller Temp | 83 |
| Duct Humidity | 94 |
| (process) | 87 |
| (process) | 91 |
| (process) | 89 |

1110

METHODS AND SYSTEMS FOR EVALUATING THE PERFORMANCE OF BUILDING PROCESSES

CROSS-REFERENCE TO OTHER APPLICATION

This application shares subject matter in common with, but is otherwise unrelated to, commonly-assigned and concurrently filed application "METHODS AND SYSTEMS FOR GENERATING A BUSINESS PROCESS CONTROL CHART FOR MONITORING BUILDING PROCESSES", which is hereby incorporated by reference.

TECHNICAL FIELD

The present disclosure is directed, in general, to process monitoring and, more particularly, to applying process monitoring to building or campus-wide systems for improving the awareness of a building's processes' performance and identifying areas for improvement.

BACKGROUND OF THE DISCLOSURE

In order to measure the performance of a building's processes over time, a large amount of data needs to be collected and analyzed. Previously used solutions include compiling point logs that list data points and their current values at various intervals. The analysis of trend data has generally been limited to single points of data associated with a status (such as an "alarm" condition, "clear" condition, "failure" condition, etc.) or multi-point trend data without a listed status. For each data point, graphs are generated for personnel to review in order to attempt to detect trends in the data.

However, attempting to analyze performance trends of a single process, much less an entire building's many processes may prove to be very time consuming and/or cost-prohibitive with existing methods. Additionally, current methods do not provide a way to easily analyze the collected data across processes and systems, or determine trends in a way to easily identify service actions that can be performed to improve process performance.

SUMMARY OF THE DISCLOSURE

Various disclosed embodiments relate to systems and methods for monitoring building processes.

Various embodiments include monitoring systems and methods. A method includes generating process control chart data for a building process. The method further includes generating a summary record of sample data from the control chart data. The method includes determining a process grade for each process using the summary record. The method further includes generating a process report card including the determined process grade for each process.

In various disclosed embodiments, outside specifications may be used to determine process control chart limits including ranges or various specifications (e.g., customer specification, performance specification, etc.). Additionally, in various disclosed embodiments, a control chart may track the sample standard deviations instead of sample means. Tracking sample standard deviations would be done to monitor the range of the process rather than its average.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 11B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

Disclosed embodiments allow for the analysis of performance and performance trends of processes within a building to more easily detect changes or degradation in the performance of a particular process. Disclosed embodiments additionally allow for the analysis over time of data across processes or systems, which provide an effective way to determine the process or processes most in need of improvement.

Disclosed embodiments aggregate and analyze data for each process that is compiled during regular operation, based on increasingly larger time intervals. The aggregated data may be used to generate a building report card detailing how well each process performs, based on the percentage of time each process performs within customer specification limits.

Figure 1:
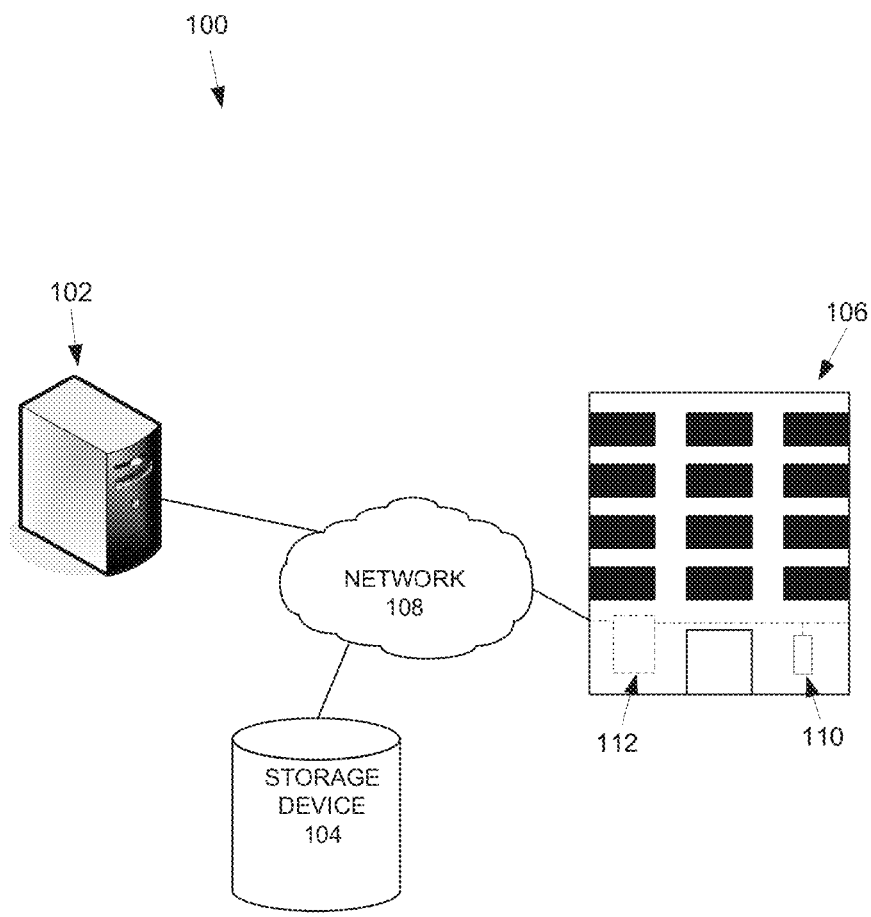
FIG. 1 illustrates a block diagram of a process monitoring environment for monitoring building processes in which various embodiments of the present disclosure are implemented.

FIG. 1 illustrates a block diagram of a process monitoring environment 100 for monitoring building processes in which various embodiments are implemented. In this illustrative embodiment, the process monitoring environment 100 includes a data processing system 102, connected to a storage device 104, and a building 106, via a network 108. The network 108 is a medium used to provide communication links between various data processing systems and other devices in the process monitoring environment 100. Network 108 may include any number of suitable connections, such as wired, wireless, or fiber optic links. Network 108 may be implemented as a number of different types of networks, such as, for example, the internet, a local area network (LAN), or a wide area network (WAN).

Elements of the present disclosure may be implemented in the data processing system 102 and the storage device 104 in connection with the network 108. For example, the data processing system 102 may store data measurements for selected processes within the building 106 in the storage device 104. The stored data measurements may be later obtained for generating control charts or generating various metrics, such as a process grade, for each selected process.

The building 106 is a location where processes are monitored. The building 106 may be a single physical building with one or more floors. In other disclosed embodiments, the building 106 may be a campus of individual buildings, where a common process applies across a number of buildings on a campus and may be monitored across the campus or may be a number of one or more buildings spread across a larger geographic area such as a city, county, state, country, or the world.

To collect building process data, the data processing system 102 obtains measurements related to various processes that may be measured within the building 106 via the network 108. For example, room temperature measurements from the building 106 are obtained by one or more sensors 110 located within the building 106. In other disclosed embodiments, a local data processing system 112 at the building 106 receives the data measurements from the sensors 110 and sends the data measurements to the data processing system 102 via the network 108. In various disclosed embodiments, building processes that may be measured include some or all of the following: room temperature, airflow, air quality, air content, duct humidity, boiler temperature, chiller temperature, as well as any other measurable metric that a user might desire to track. While the processes described in the various disclosed embodiments relate generally to an HVAC system, any number of suitable systems may also benefit from the system and methods that are disclosed.

In disclosed embodiments, the data processing system 102 receives the data measurements and performs calculations on the data measurements to generate process control chart data, which may be used to generate one or more control charts. Control charts, described in greater detail below, provide a graphical depiction that allows an observer to see how a process is functioning with respect to a set point, such as a desired temperature setting, with respect to specification limits, or other values. In various disclosed embodiments, control chart data is also used as the basis for further calculations or analysis, such as generating a process report card.

In various disclosed embodiments, control charts follow one process variable. For example, "Room 2270 temperature" or "duct 1234 air flow" would be depicted in separate control charts as each are considered separate process variables. Multiple process variable tracking in a single chart could result in a "bad" process being hidden by multiple "good" processes. However, results of data from individual process control charts may be combined to build aggregate data.

In disclosed embodiments, the data processing system 102 aggregates the data measurements for one or more processes into summaries that account for short time frames, such as an hour or less, up to long time frames, such as a year. The summaries, described below in greater detail, capture more than just an average of the aggregated data. For example, in various disclosed embodiments, the summaries capture the mean, standard deviation, the number of samples, min and max values, skewness (shape of bell curve), and kurtosis (height of bell curve) of the data for each summary. The captured data is stored by the data processing system 102 in the storage device 104. In various disclosed embodiments, the storage device 104 is located within the data processing system, rather than in communication via the network 108, as depicted in FIG. 1.

The description of process monitoring environment 100 in FIG. 1 is intended as an example and not as a limitation on the various embodiments of the present disclosure. For example, the process monitoring environment 100 may include additional server computers, client devices, and other devices not shown. In some embodiments, all or some of the functionality of the data processing system 102 may be implemented at the building 106 by the local data processing system 112. In some embodiments, all or some of the functionality of the data processing system 102 may implemented in one or more server computers in a cloud computing environment within or in communication with network 108.

Figure 2:
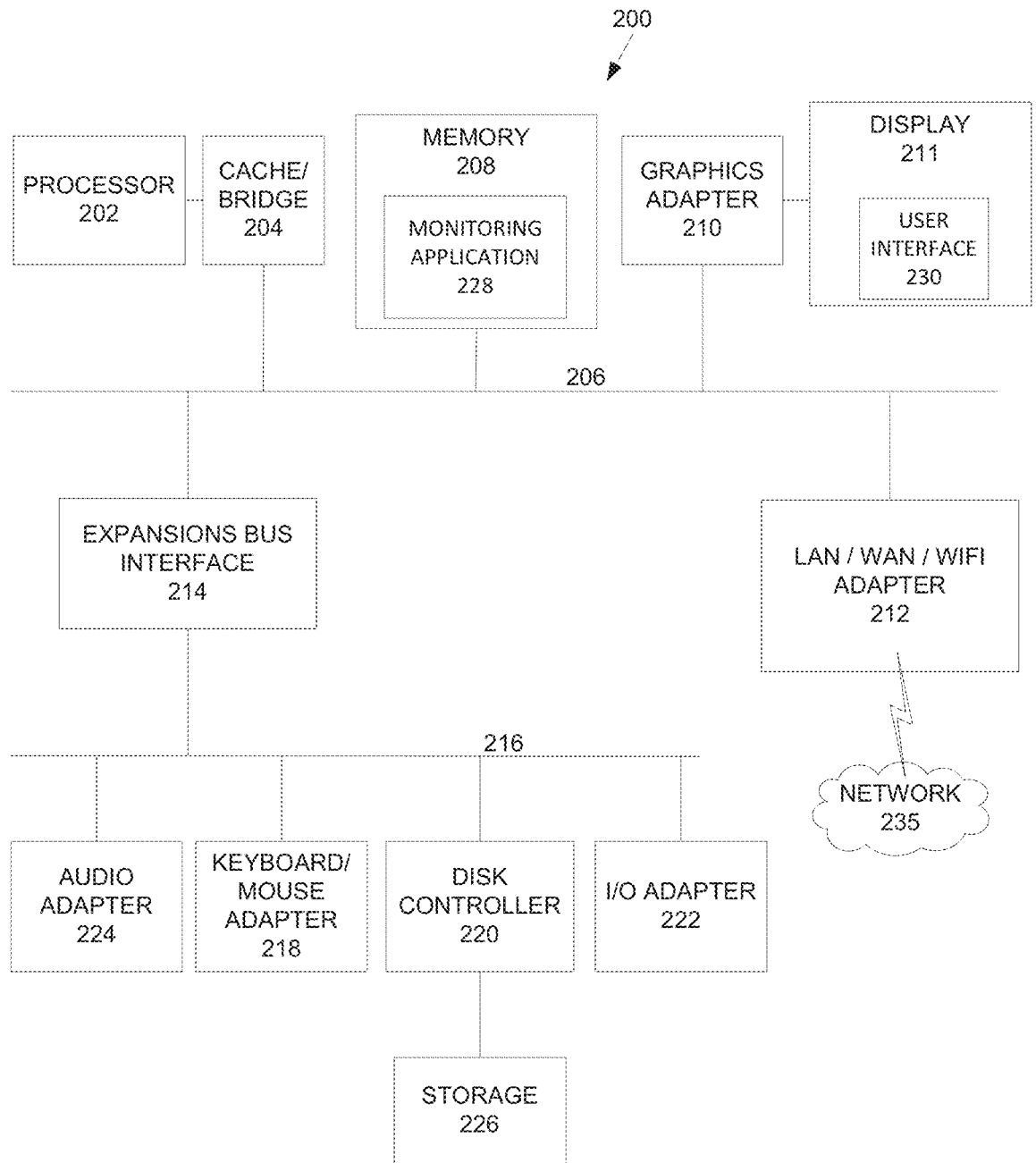
FIG. 2 illustrates a block diagram of a data processing system in which various embodiments of the present disclosure are implemented.

FIG. 2 depicts a block diagram of a data processing system 200 in which various embodiments are implemented. The data processing system 200 includes a processor 202 connected to a level two cache/bridge 204, which is connected in turn to a local system bus 206. The local system bus 206 may be, for example, a peripheral component interconnect (PCI) architecture bus. Also connected to local system bus in the depicted example are a main memory 208 and a graphics adapter 210. The graphics adapter 210 may be connected to a display 211.

Other peripherals, such as a local area network (LAN)/Wide Area Network/Wireless (e.g. WiFi) adapter 212, may also be connected to local system bus 206. An expansion bus interface 214 connects the local system bus 206 to an input/output (I/O) bus 216. The I/O bus 216 is connected to a keyboard/mouse adapter 218, a disk controller 220, and an I/O adapter 222. The disk controller 220 may be connected to a storage 226, which may be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives, solid state drives, and compact disk read only memories (CD-ROMs) or digital versatile disks (DVDs), and other known optical, electrical, or magnetic storage devices.

Also connected to the I/O bus 216 in the example shown is an audio adapter 224, to which speakers (not shown) may be connected for playing sounds. The keyboard/mouse adapter 218 provides a connection for a pointing device (not shown), such as a mouse, trackball, trackpointer, etc. In some embodiments, the data processing system 200 may be implemented as a touch screen device, such as, for example, a tablet computer or touch screen panel. In these embodiments, elements of the keyboard/mouse adapter 218 may be implemented in a user interface 230 in connection with the display 211.

In various embodiments of the present disclosure, the data processing system 200 is a computer in the process monitoring environment 100, such as the data processing system 102 or the local data processing system 112. The data processing system 200 implements a monitoring application 228. The monitoring application 228 is a software application that collects process data covering any number of processes within a building and aggregates the process data for analysis. Further calculations occur using the process data, in various embodiments of the disclosure, generating summaries that are used for determining process grades representing the performance of a process over various time intervals and illuminating potential areas for improvement, as will be discussed in greater detail below.

In various embodiments of the present disclosure, the data processing system 200 uses the received data measurements to plot a plurality of data points representing a spread of values from a setpoint in order to generate one or more control charts for the processes. The setpoint is a desired value of a control variable that the process control algorithm is trying to reach and maintain. The data processing system 200 performs various mathematical calculations on the data measurements. For example, the mean, range, deviation, proportion, variation (Cp), center tendency ($C_k$), and process capability ($C_{pk}$) may be calculated and stored by the data processing system 200.

In order to accurately model building processes, disclosed embodiments may average samples from process-specific database records and place a summary of the samples into resultant records. The records capture not only the average of the samples, but also other information such as the mean, standard deviation, number of samples, minimum and maximum values, skewness, and kurtosis. Records may additionally be generated for varying time intervals, depending upon the scope of analysis that is desired. Some example time intervals include, but are not limited to, hour, day, week, month, season, quarter, and year.

Those of ordinary skill in the art will appreciate that the hardware depicted in FIG. 2 may vary for particular implementations. For example, other peripheral devices, such as an optical disk drive and the like, also may be used in addition or in place of the hardware depicted or, for example, the processing system may be a building field panel or room controller, such as a Apogee field panel or Apogee TEC. The depicted example is provided for the purpose of explanation only and is not meant to imply architectural limitations with respect to the present disclosure.

One of various commercial operating systems, such as a version of Microsoft Windows™, a product of Microsoft Corporation located in Redmond, Wash. may be employed if suitably modified. The operating system may be modified or created in accordance with the present disclosure as described, for example, to implement the monitoring application 228.

LAN/WAN/Wireless adapter 212 may be connected to a network 235, such as for example, network 108, which may be any public or private data processing system network or combination of networks, as known to those of skill in the art, including the Internet. Data processing system 200 may communicate over network 235 to one or more computers, which are not part of data processing system 200, but may be implemented, for example, as a separate data processing system 200.

Figure 3:
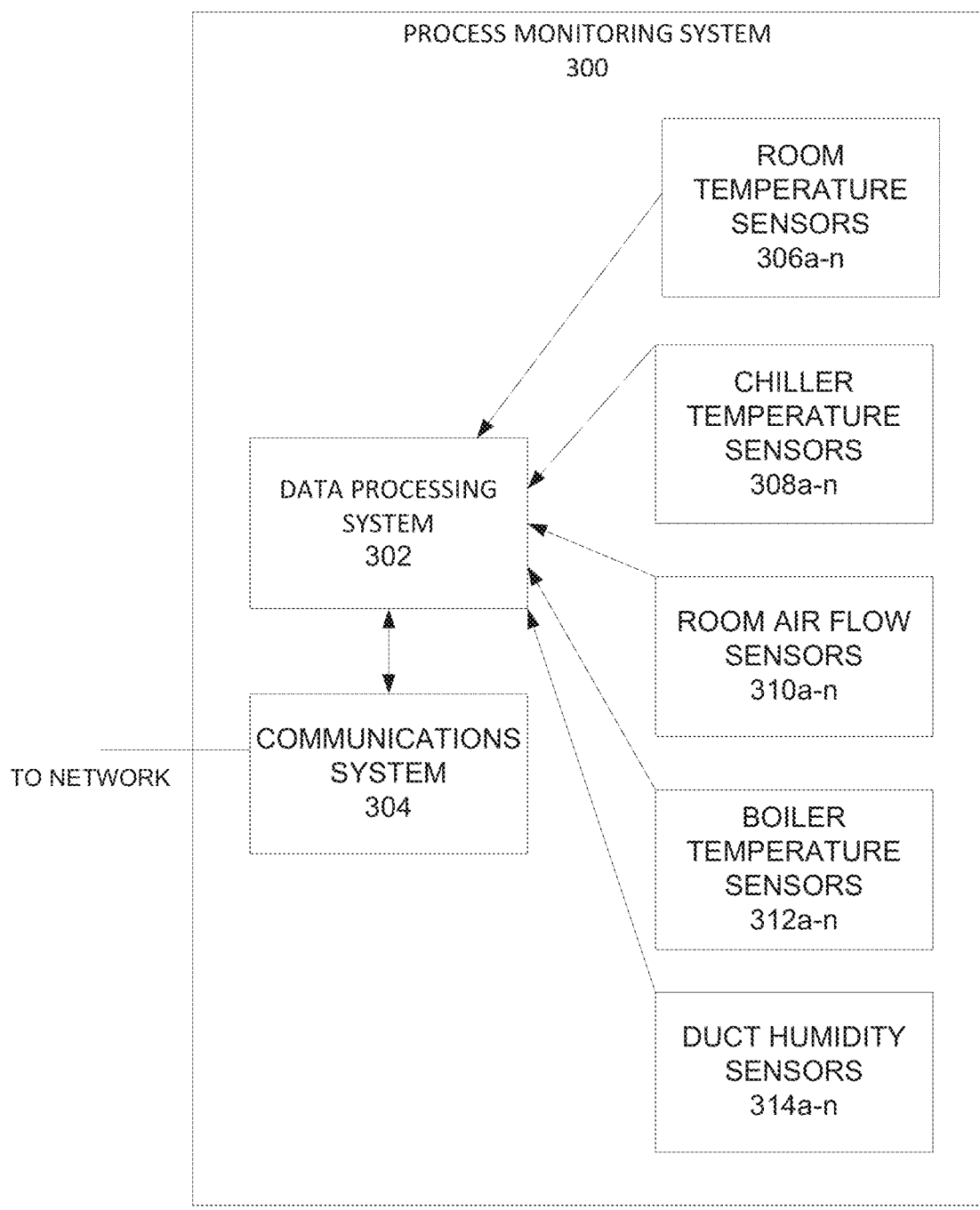
FIG. 3 illustrates a block diagram of a process monitoring system in which various embodiments of the present disclosure are implemented.

FIG. 3 illustrates a block diagram of a process monitoring system 300 in which various embodiments are implemented. In these illustrative examples, the process monitoring system 300 monitors one or more processes within a building, such as the building 106 in FIG. 1. Process monitoring system 300 may be an example of one embodiment of a network of sensors 110, the local data processing system 112, and/or the data processing system 200. For example, in a disclosed embodiment, the process monitoring system 300 may include building processes related to an HVAC system, as described below in greater detail.

The process monitoring system 300 includes a data processing system 302 operably connected to sensors monitoring various processes in a building and a communications system 304. In various disclosed embodiments, the process monitoring system 300 includes room temperature sensors 306a-n (collectively 306), chiller temperature sensors 308a-n (collectively 308), room air flow sensors 310B-n (collectively 310), boiler temperature sensors 312a-n (collectively 312), and duct humidity sensors 314a-n (collectively 314). The communications system 304 in various embodiments may be any system designed to facilitate communications with the data processing system and other external systems over a network.

Room temperature sensors 306 measure ambient air temperature and may be placed throughout a building. In disclosed embodiments, multiple sensors are located in the same room, if necessary, to account for variations in the air temperature in a given space. In addition to the air temperature measurement, other data may be sent to the data processing system 302 from the sensors, or may be associated with the sensor by the data processing system 302. For example, the coordinates and/or other location information of a particular sensor within the building may be used for later aggregation of the data. The exact time a sample was taken, such as from a timestamp, is also information that may be received from the sensor, or associated with the data measurement by the data processing system 302, as the measurement is received.

The room temperature sensors 306 may be an analog sensor, a resistive temperature device, a thermistor, and/or any other type of temperature sensor. The temperature sensors 306 send measurements of ambient air temperature along with related data to the data processing system 302. In various disclosed embodiments, the related data may include time stamping information, status conditions, priority information, and enumerated point data (among others), as will be described below in greater detail. Enumerated types refer to encoding (longer) text strings into predetermined numeric values, thus reducing storage space for the text strings. For example: Sunday, Monday, Tuesday, Wednesday, Thursday, Friday, Saturday, Holiday may be encoded as 0, 1, 2, 3, 4, 5, 6, 7. For this example, the numeric value can be stored in less than half a byte whereas the original stings would have required at least 9 bytes.

The data processing system 302 may also receive data measurements from chiller temperature sensors 308. Chiller temperature sensors 308 measure water temperature within a chiller, the water temperature as it enters the chiller, and/or water temperature as it leaves the chiller in an HVAC system. Examples of chiller temperature sensors include fluid line temperature sensors or any other sensor operable to measure the water temperature of a chiller.

Additionally, the data processing system 302 may receive data from room air flow sensors 310. Room air flow sensors 310 measure the velocity of the air within ducts or at air vents throughout an HVAC system in a building. Some air flow sensors 310 additionally measure air temperature, and in certain disclosed embodiments may be used in place of temperature sensors 306, rather than including both sensor types.

The data processing system 302 may also receive data measurements from boiler temperature sensors 312. Boiler temperature sensors 312 measure water temperature within a boiler, the water temperature as it enters the boiler, and/or water temperature as it leaves the boiler. Examples of boiler temperature sensors include fluid line temperature sensors or any other sensor operable to measure the water temperature of a boiler.

The data processing system 302 may also receive data measurements from duct humidity sensors 314. Duct humidity sensors 314 measure the humidity level within the duct work of a building's HVAC system. Examples of duct humidity sensors 314 include capacitance-type relative humidity sensors, solid stat humidity sensors, or any other sensor operable to measure the humidity level. Similar to the above described room air flow sensors 310, temperature may also be measured by some duct humidity sensors 314 and may be used in place of, or in addition to, temperature sensors 306.

In some embodiments, the data processing system 302 implements the monitoring application 228. For example, the data processing system 302 may perform functions for collecting and aggregating the measurement data, generating control chart data, generating control charts, checking control chart rule violations, generating grades for building processes, and identifying processes that need improvement.

In other embodiments, the data processing system 302 sends, via the communications system 304, the measurement data with or without the time stamping information for processing by an external device, for example, the data processing system 102 in FIG. 1.

While process variables (temperature, humidity, airflow, etc.) have been described as the value being tracked, a process setpoint (i.e., 72 degrees F.) or the value minus setpoint may also be tracked. In various disclosed embodiments, the control chart value may be any of these or other values not specifically described.

Attributes such as time of day, status, priority, and enumerated types, for example, may be used in various disclosed embodiments to determine whether a received reading should be included in a specific data sample. The various attributes may then be incorporated as part of the control chart's name and/or the chart's characteristics. As an example, in various disclosed embodiments, rules relating to timestamps that are associated with the values may be used to determine when the data corresponds to daylight hours. If analysis needs to be made only during daylight hours for a particular process relating to room air flow, the data processing system will now be able to incorporate just that data. The resulting process control chart may be labeled "Room air flow during daylight hours" to indicate that samples were filtered based on an attribute rule.

Because some processes may not be operational all of the time, in various embodiments, the time or day that a reading is received by a data processing system may influence whether or not the particular reading is placed in the sample to be used for the control chart data. For example, if ambient air temperature is being monitored in classrooms where no one is in the classrooms on weekends or after 5:00 pm, data readings received during those times will not go into the samples to be used for calculations that generate the control chart.

When a building automation system is in operation, there are status conditions that affect how a process is controlled. Some example status condition attributes may include Day Mode, Night Mode, Holiday Mode, Time of Day, Normal Operation, Alarm, or any other status that may be defined by a user. In one disclosed embodiment, a user may want to integrate only received data values into a sample when a process is under "Normal Operation," such as in automatic operation mode. In one example embodiment, an HVAC system may only operate during business hours, and Normal Operation would only include those readings based on rules generated for the status condition, when performing calculations. This technique effectively filters readings from the sample that are outside of the Normal Operation because the system is not being required to perform within the typical specifications. The resulting process control chart would then get a name qualifier based on the filter used. An example name may be "Room 2270 Temperature when in Normal Operation Mode." These are just two examples of additional status and priority rules that may be used by the data processing system.

There are often multiple application algorithms trying to drive an individual process. The point priority attribute decides which has permission to operate a point at any time. In various disclosed embodiments, "Operator" priority is the highest. Other priorities may include Peak Demand Limiting, Start Stop Time Optimization, and Duty Cycling, which all have lower priority than Operator. Generally, "Normal" priority has the lowest priority. Point priority, like status conditions, may become filters and qualifiers of the control chart data, as described above. Although certain point priorities are named, the ones mentioned are not intended to limit the scope to just those listed.

Another filter that may be present in various disclosed embodiments involve the use of enumerated types. Data points may be enumerated, where programmed values are given names. A wind vane value, for example may be converted from North, NNE, NE, ENE, East, etc. to encoded values such as 0, 1, 2, 3, 4, etc. Having enumerated types allows for another type of attribute filter on the control chart data, in addition to priority and status conditions.

Those experienced in the art will realize that these and other attributes may be incorporated into the data characteristics to define and clarify the exact conditions under which a particular process data set is/was generated and the conditions under which the data was captured.

Figure 5:
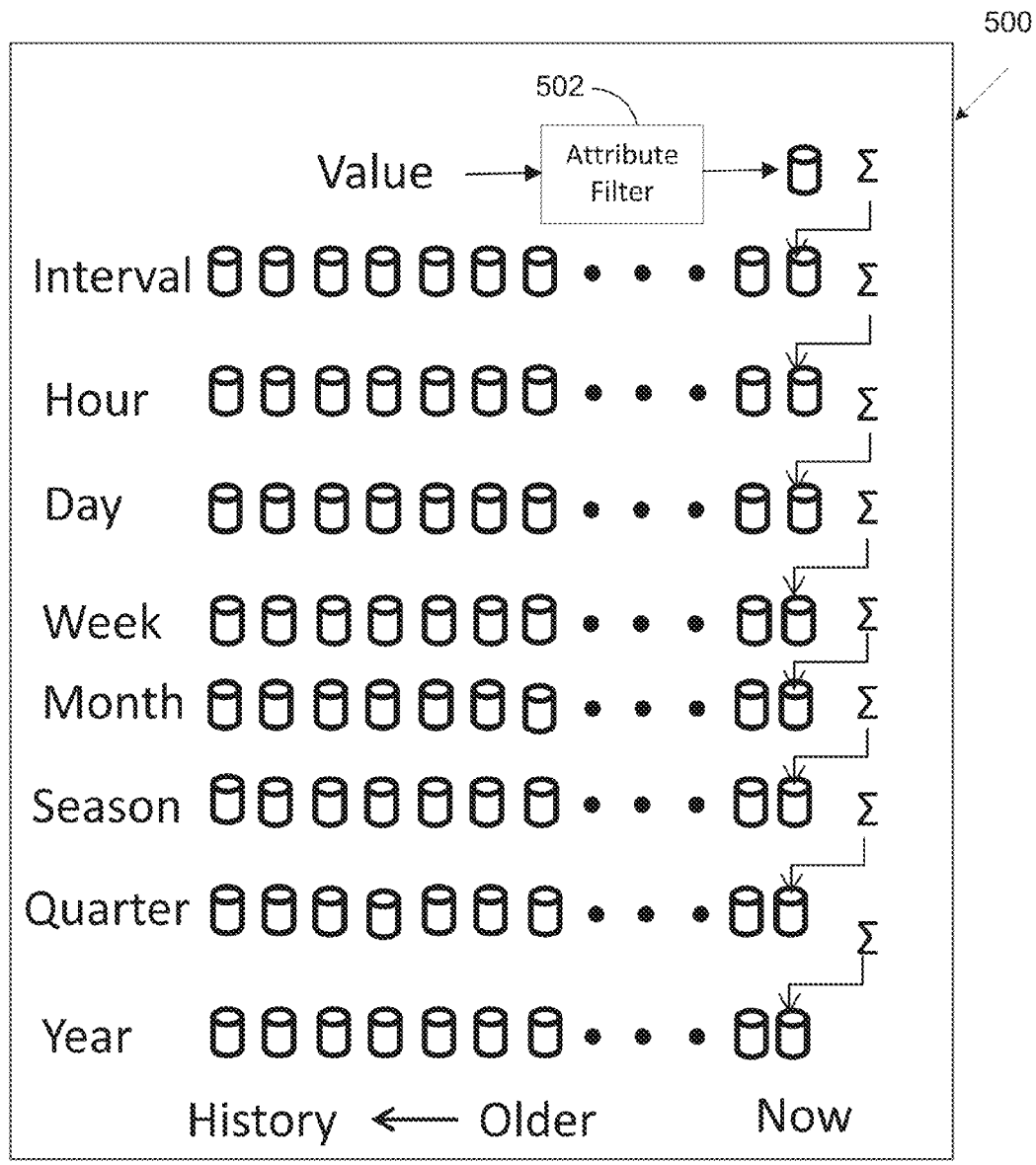
FIG. 5 depicts an illustration of preparing various levels of summaries of a building process data.

In various disclosed embodiments, information for each process/attribute set may be kept in a series of database records of various time intervals and form a database record set (see FIG. 5). Typically, there are multiple records per interval with accumulated data typically on successive interval times. Aggregate processes (FIG. 6) use the same data record set format but are supplied data from more than one process. Records may contain accumulated process data, analysis results from control chart and/or process grading, or both. Analysis tools (FIGS. 7-11B), such as control charts or process grades (described below), analyze the data in a single database record set (single or aggregate process) and inform the user of how process(es) associated with that record's set are performing over the analyzed time interval (specific interval records in record set). Each process keeps a "where used" list with links to every database record set that may use the incoming process value. Attribute checking is done before including new process values into the record set. A record set for a particular control chart may be referred to as the control chart data.

Figure 4:
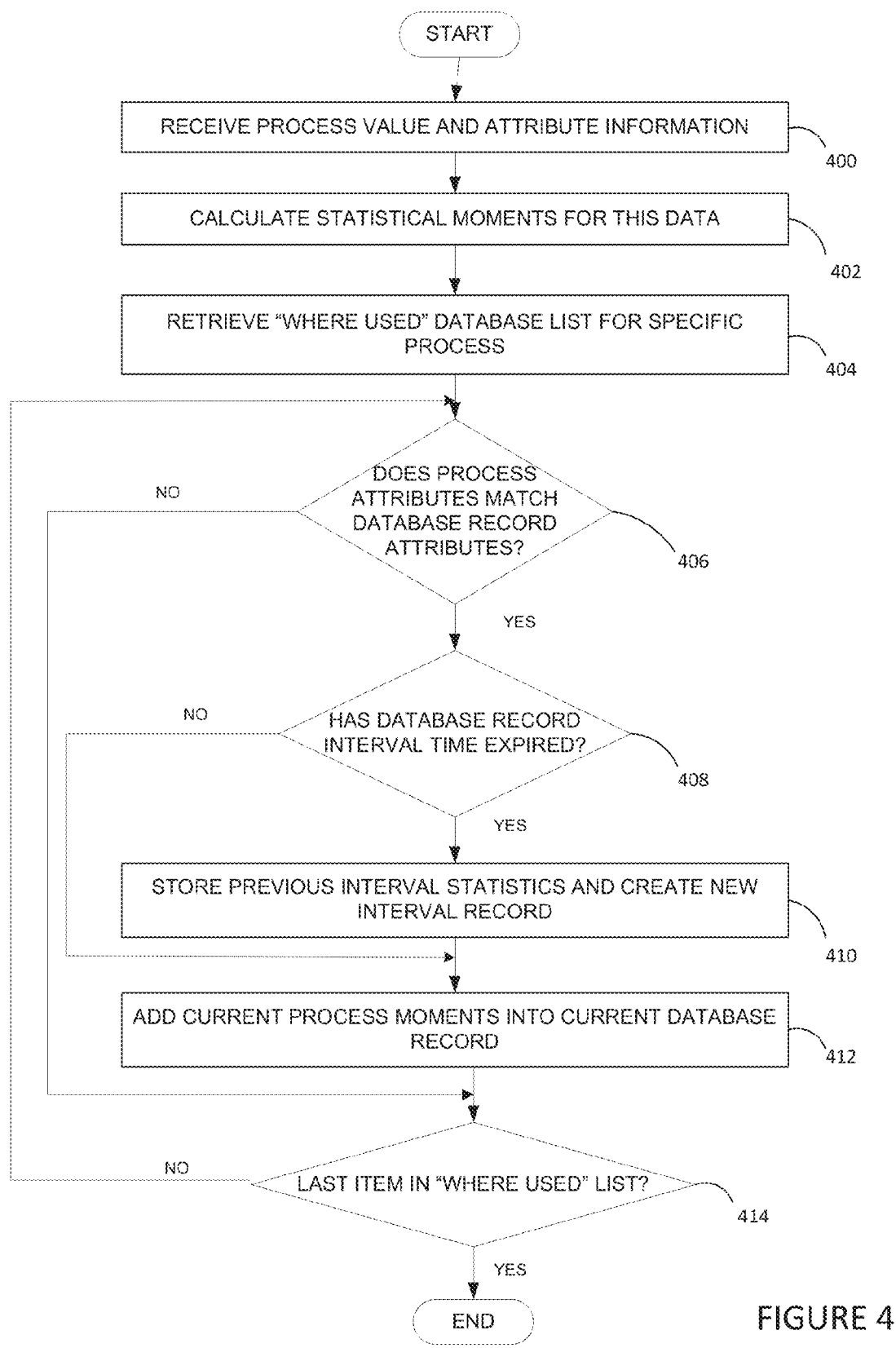
FIG. 4 depicts a flowchart of a process for gathering building process data depicting an individual process over time and storing the process data in process-specific database records.

FIG. 4 depicts a flowchart of a process for gathering building process data depicting an individual process over time in accordance with disclosed embodiments. This process may be performed, for example, in one or more data processing systems, such as the data processing system 200, configured to perform acts described below, and referred to in the singular as "the system." The process may be implemented by executable instructions stored in a non-transitory computer-readable medium that cause one or more data processing systems to perform such a process. For example, in various embodiments, monitoring application 228 comprises the executable instructions to cause one or more data processing systems to perform such a process.

In various disclosed embodiments, a process value and attribute information may be received from a sensor or another data record (Step 400). The process value may be a sensor reading along with an attribute, such as a time stamp or any of the attributes, as described above with respect to FIG. 3. The sensor is preferably a physical sensor device.

Statistical moments for the received data may be calculated in Step 402. A statistical moment may include parameters such as an average (or mean), standard deviation, number of samples, minimum and maximum values, skewness, and kurtosis, as described above. In various embodiments of the present invention, although individual readings may be captured for a process and then statistics calculated from them, it may be more memory efficient to keep over the process interval: 1) the sum of all process readings; 2) the sum of the square of the process readings; 3) sum of the cube of the process readings; 4) sum of the square of the square ($4^{th}$ power) of the process reading; and 5) the number of samples composing those values. These values, known sometimes as the statistical moments, can be used to calculate the mean (1 & 5), the standard deviation (1, 2, & 5), the skewness (1, 2, 3, & 5) and the kurtosis (1-5). This embodiment typically conserves memory when many samples are needed and simplifies the task of combining like processes into an aggregate process.

Each of the database record sets may be located in, referenced from, or pointed to by an entry in a "Where Used" list for the specific process. The "Where Used" list defines each record set that will determine if the new process value is to be included within its database record set data by doing attribute comparison.

A "Where Used" database list for a specific process may be retrieved in Step 404. Each of the received values may be located in or associated with one or more control chart databases. The "Where Used" list for each process provides information relating the control charts to process variables. Process values may be associated with multiple control charts within the database, so the "Where Used" database keeps track of this information.

In Step 406, process attributes and database record attributes are compared to determine if there is a match. For example, if a process attribute indicated the system was operating in "Day Mode" and there was a database record attribute from the "Where Used" database list which matched, the process value would be included in the aggregated sample. Additionally, if there is a match, the database record interval time is checked for expiration in Step 408. An hour interval is considered to be expired after sixty minutes, a day interval is considered to be expired after 24 hours, a week interval is considered to be expired after 7 days, etc.

If the database record interval time has expired, previously collected interval statistics are stored and a new interval record is created in Step 410. If the database record interval time has not expired, or if it had expired and a new interval record was created in Step 410, the current process moments are added into the current database record as building process summary data in Step 412. In various disclosed embodiments, the building process summary data may also be displayed and/or output to another process.

In Step 414, a check is made for more items in the "Where Used" list. This check is needed in case a received process value is used in more than one database record set and may need to be included in other database record sets. If there are more record sets that should include the process value, Steps 406 through 412 are repeated. If there are no more items in the "Where Used" list, then the procedure ends.

FIG. 5 depicts an illustration of preparing various levels of summaries of building process data. In various disclosed embodiments, process data summaries are generated using records of various intervals from minutes, to hours, up to years (or longer). FIG. 5 shows a database concept for a single monitored process with a unique set of attributes. An attribute filter 502 between the received data values and the database record filters the data for unique sets of attributes that are desired for the database record set. This model would be duplicated for each individual process with corresponding attribute data. The model would also be duplicated for each aggregate process (defined below) with its corresponding attribute information. The number of records for each interval may vary from record set to record set.

In various disclosed embodiments, summaries by various time intervals may be dynamically built to capture "summarized" data moments from sample data of smaller intervals. With higher interval summaries capturing the essence of the process operation, fewer shorter summaries are required for long term analysis.

In other words, FIG. 5 graphically depicts an iterative reuse model. In various disclosed embodiments, process data is accumulated and at the end of each interval, the most recent interval of data represented by the $\Sigma$ symbol on the far right of the illustration, is added as a new data record into the next longer time interval data for that process (represented by an arrow).

Since all records in FIG. 5 contain the same amount of data fields and are the same physical size, it is easy for those skilled in the art to recognize that by condensing smaller interval records into the next longer interval, a significant number of records are no longer needed, thus reducing system memory requirements. Thus the number of records per interval size per process becomes a trade-off of how much interval history to retain versus how much interval memory is used.

For those skilled in the art, it will be understood that although smaller intervals of data are being condensed into longer interval samples, the effects of those shorter samples are still statistically influencing that larger sample. Although one cannot see process details available at the lesser interval, the greater interval still tells that the process operated within the range of mean minus 3 standard deviations and the mean plus 3 standard deviations. For more process information, a minimum reading and maximum reading per sample could also be included in the data record and appropriately calculated for the longer intervals. Min/Max readings are typically always inside the 3 Standard Deviation range.

It is often desirable to combine like processes with like attributes into an aggregate process with indicators of how that combined process is operating. In various disclosed embodiments, this may be done by adding each process statistical moment into aggregate statistical moments. Calculating statistical values from the aggregate values (moments) will yield statistics on the aggregate process. Typically, these aggregate processes would not be used for control charts, but may be used in the grading system described below.

If a set of like (similar) processes are kept in the database as individual processes and are also combined into an aggregate process, as long as they are kept at the same interval levels, then the aggregate process can answer performance questions for the group. However, if performance slips then the individual processes can be reviewed to see which process "pulled down" the aggregate process.

Figure 6:
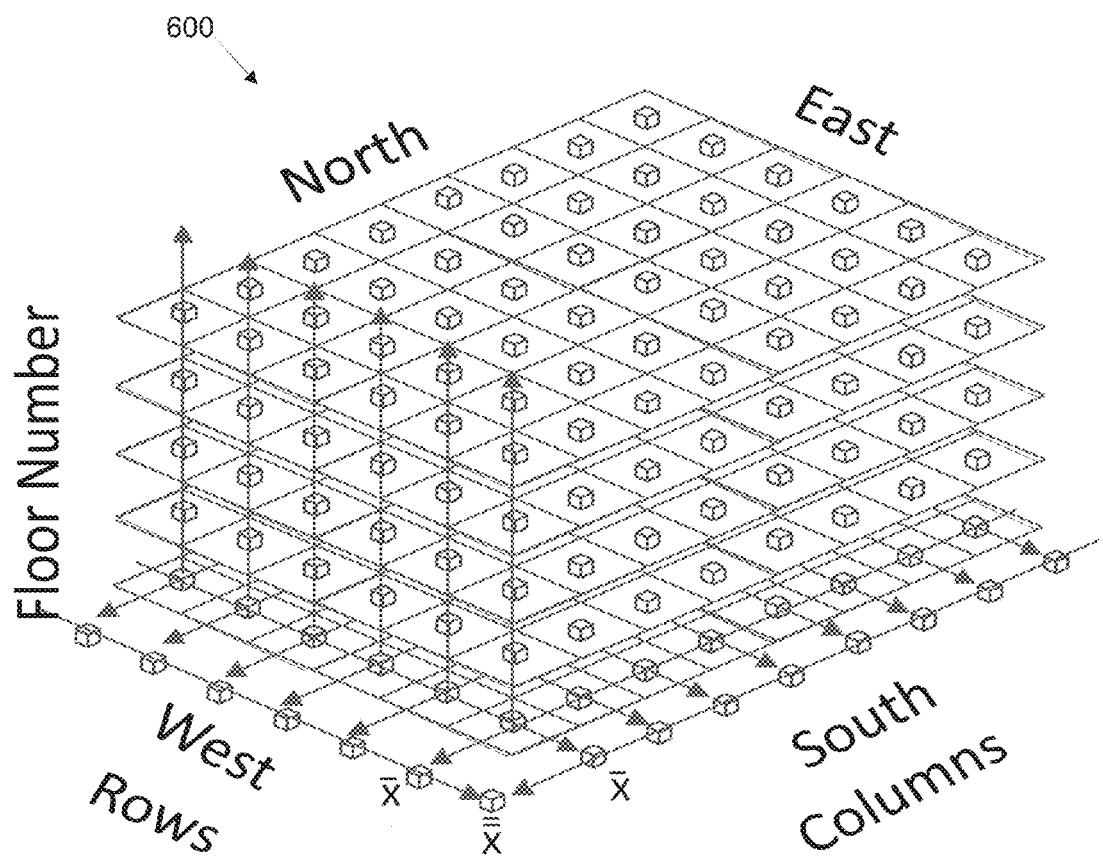
FIG. 6 depicts an illustration combining a monitoring system's process statistics in a plurality of ways.

FIG. 6 depicts an illustration 600 combining a process's statistics in a plurality of ways, in accordance with various embodiments of the present disclosure. In the represented building, each layer may represent a floor of a building, with each square being a separate room or sensor on the floor.

Arrows running parallel to the "Floor Number" label are combining data from rooms or spaces stacked one above the other into aggregate values. Arrows running parallel to the "Rows" label are combining a of rooms within a row. Arrows running parallel to the "Columns" label are combining successive columns of rooms or spaces into aggregate values.

The arrow next to the West label is gathering aggregate values of the column aggregate values (aggregate of aggregate). Similarly the arrow next to the South label is gathering aggregate values of the row aggregate values (aggregate of aggregate). This recursive aggregation of data allows for individual processes to be grouped into various-building specific area types such as building faces, internal or external zones, or other pertinent data abstractions.

Many different types of processes may be monitored such as temperature, airflow, humidity, chillers, boilers, or any other type of mechanical equipment. By combining statistics across a floor, a wing, a face of a building, or otherwise, aggregate values may be calculated and compared to other like areas and performance compared between them. Entire building areas may be combined and aggregate values calculated and compared in a similar manner.

Figure 7:
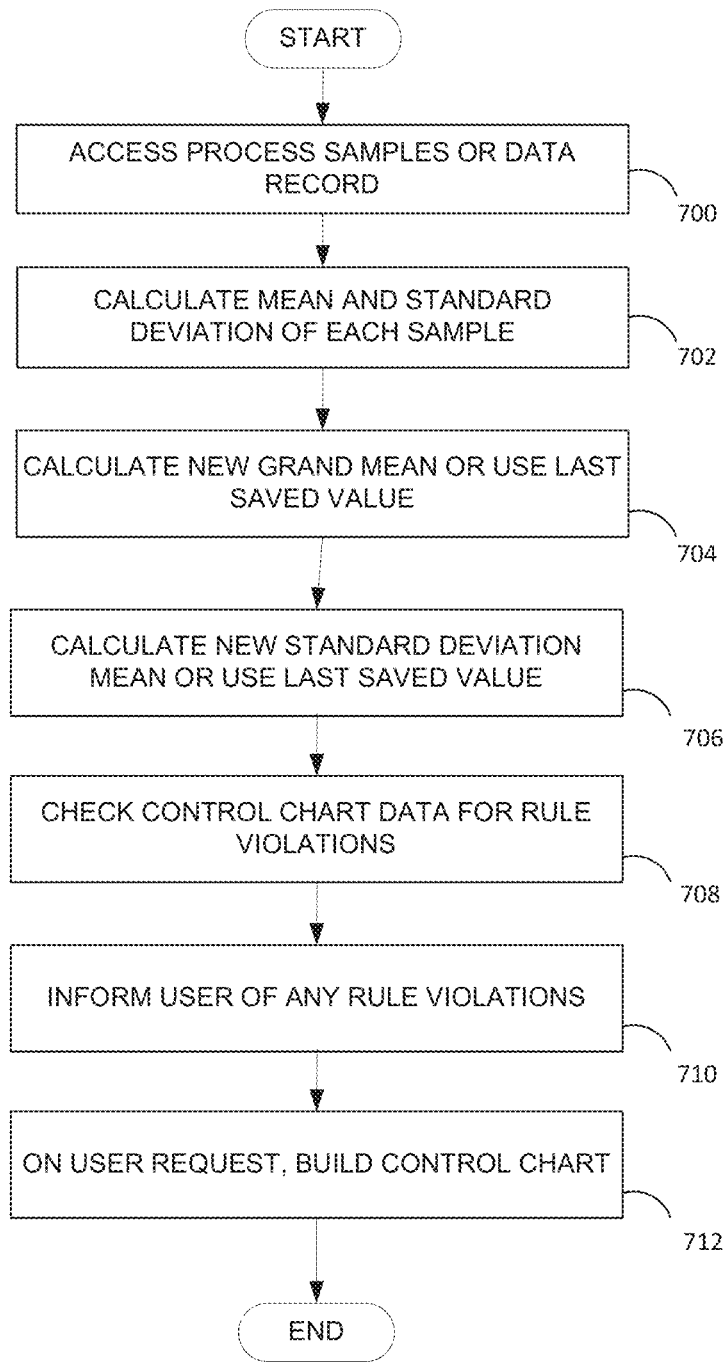
FIG. 7 depicts a flowchart of a process for generating control chart data.

FIG. 7 depicts a flowchart of a process for generating control chart data in accordance with various embodiments of the present disclosure. In Step 700, process samples or a data record may be accessed. In various embodiments, process samples are not yet part of a data record and this process is performed as the samples are received. In other disclosed embodiments, process samples are stored in a data record, and are accessed from a database.

In Step 702, a mean value and standard deviation of each sample may be calculated. In various disclosed embodiments, to calculate the sample mean value for each sample, the data processing system 200 totals each reading received in the specified time interval and divides the total by the number of readings received. The sample mean value may then be stored for further use, as described below. In various disclosed embodiments, the specified interval of time may be in 1, 2, or 5 minute increments. In other embodiments, the time interval may be shorter or longer, depending upon the particular process being measured, as well as customer or performance specifications. The calculated standard deviation gives an indication of how much the readings vary within each set of process data samples.

In Step 704, a new Grand Mean may be calculated, or if the Grand Mean has previously been stored, a last saved value may be used. The mean of the sample mean values is referred to as the Grand Mean. The Grand Mean is calculated by summing each of the sample mean values and dividing by the number of sample mean values. On a process control chart, the grand mean may be plotted as the center line, as shown in FIG. 8B below. In other disclosed embodiments the grand mean may be calculated by using an outside specification. For example, for a control chart where value minus setpoint is being tracked, the grand mean would be 0.

In Step 706, a new standard deviation mean may be calculated, or the last saved value for the standard deviation mean may be used. When generating a control chart, the standard deviation mean value, also referred to as sigma, may be used to determine the value of the increments to place horizontal lines on the control chart, creating "zones" around the grand mean. The zones around the grand mean of a control chart represent a parametric value of standard deviation. For example, three zones above the grand mean may be referred to as +1 sigma, +2 sigma, and +3 sigma, respectively. Three zones below the grand mean may be referred to as −1 sigma, −2 sigma, and −3 sigma, respectively. The zones are illustrated and described in greater detail below in reference to FIG. 8B. As described above, the difference between each zone is the standard deviation mean value, or "sigma."

Control chart data may be checked for rule violations in Step 708. The rules relate to whether a process is functioning according to desired specification. Rules are described below in greater detail in reference to FIGS. 8A and 8B. A user is informed of any rule violations in Step 710. If the user requests a control chart, a control chart may be built in Step 712.

Although the term control chart is used throughout this document, those skilled in the art will include within the context of this term X-bar charts, p-Charts, u-Chartsnp charts, and charts using the Cumulative Sum (CuSum) format.

Figure 8A:
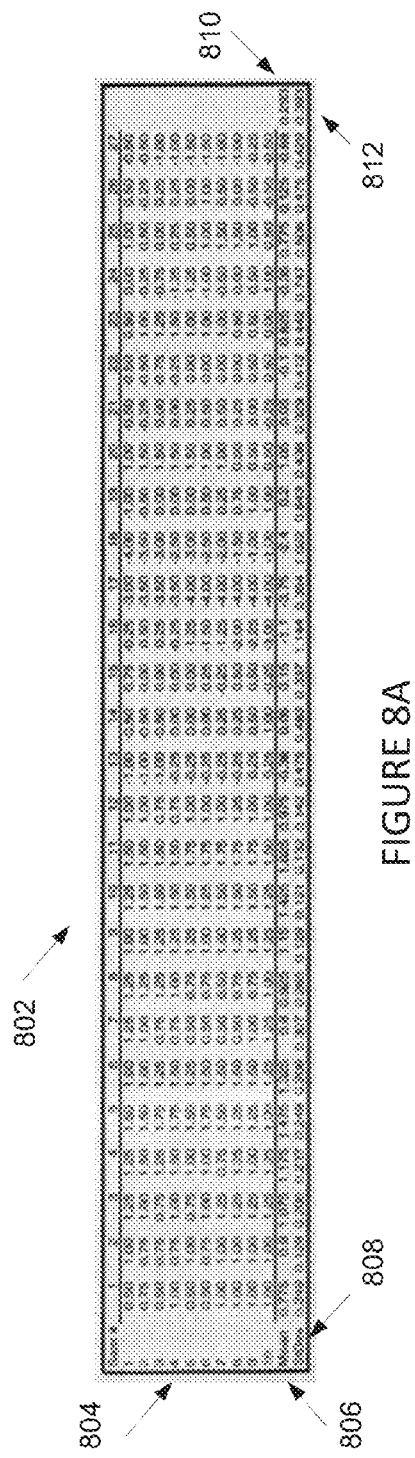
FIG. 8A depicts a chart of sample data used in preparing a building process control chart.
Figure 8B:
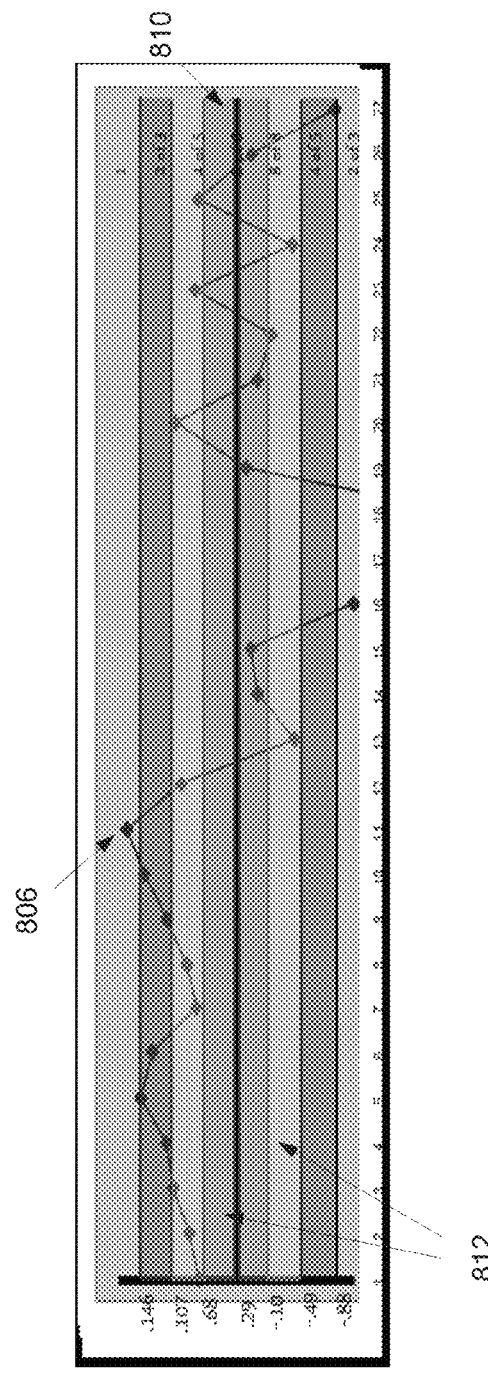
FIG. 8B depicts a building process control chart.

FIG. 8A depicts a chart of sample data used in preparing a building process control chart. FIG. 8B depicts a building process control chart prepared from the data in FIG. 8A. In FIG. 8A, there are 27 samples 802 from a building process. Each sample 802, which could be from a single sensor in a process taking multiple readings over a period of time, is represented by a column numbered 1-27 in this example. Ten readings 804 were recorded over a given time interval for each sample 802 and are represented by the rows. For each sample 802, a sample mean 806 is calculated (shown in the next to last row). A sample standard deviation 808 for each sample is also calculated and shown in the last row of FIG. 8A, under the value for the sample means 806. The last column lists a grand mean (0.293) 810 in the next to last row and the standard deviation mean or sigma value (0.393) 812 in the last row.

The example control chart illustrated in FIG. 8B is derived from the data in FIG. 8A. The center line represents the grand mean (0.293) 810. Plotted data points represent the sample mean 806 for each sample. Each zone, delimited by a horizontal line, is spaced apart by the sigma value (0.393) 812, as described above. Also in FIG. 8B, +1 sigma and −2 sigma are pointed to as examples of 2 of the zones. It is important to note that colors or shading on the process control chart are included in FIG. 8B merely to accentuate the zones or bands. Any color or shading, if desired, could be used in various disclosed embodiments.

A control chart can detect if changes in process variable values are due to random change (such as tolerance stack-ups etc.) and should be ignored or if a change occurred in a process and the process is not operating properly. In cases where a process is not operating properly, a fix is required. In various embodiments, rules may be used that determine if a process is functioning within desired specifications.

For example, in various disclosed embodiments, rules can detect whether the process is operating in a "random variability mode" where no rules are broken or can detect when rules are broken and a change in the process has occurred. Rules detecting drifting (samples moving away from centerline on the same side of center line), slammed (samples outside red zones), or bouncing (standard deviations increasing out of control), among others, may be defined. In various disclosed embodiments, rules relating to values within the various zones may exist to detect the various properties mentioned. For example: 1 point above +3 sigma (red zone), 1 point below −3 sigma (red zone), 2 of 3 points in +3 sigma (red zone) or above, 2 of 3 points in +3 sigma (red zone) or below, 4 of 5 points in +2 sigma (yellow zone) or above, 4 of 5 points in +2 sigma (yellow zone) or below, 8 in a row in +1 sigma (green zone) or above, and 8 in a row in −1 sigma (green zone) or below. Of course, there are many more rules for various properties, although they are not specifically described here.

While various disclosed embodiments describe calculating a grand mean and standard deviation mean for control chart limits, other embodiments may be used. In various disclosed embodiments, outside specifications are used to set limits on the control chart. Using a process control chart for room temperature as an example, if room temperature is to be 72+/−1 degree, the grand mean is 72 degrees and the standard deviation is the tolerance (in this case 1) divided by three (or 0.333). In various other embodiments, other values may be used to determine the control chart limits including ranges or various specifications, such as customer or performance specifications, although the disclosure is not intended to be limited to the ones listed herein.

Figure 9:
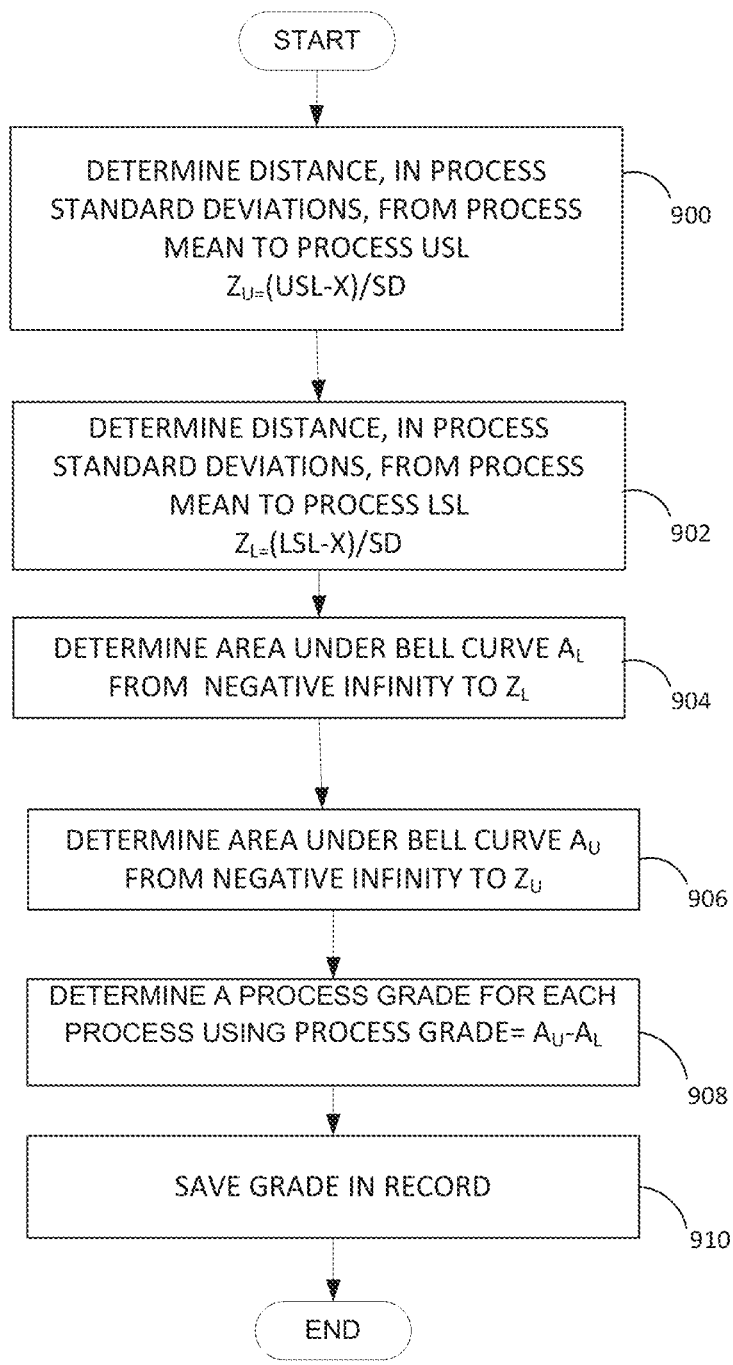
FIG. 9 depicts a flowchart of a process for evaluating system performance of a building process by generating a single process grade.

FIG. 9 depicts a flowchart of a process for evaluating system performance of a building process by generating a single process grade.

In Step 900, a distance ($Z_U$), in Process Standard Deviations, is determined by subtracting the Process Mean (X) from the Process Upper Specification Limit (USL) and dividing by the Process Standard Deviation (SD).

$$Z_U=(USL-X)/SD$$

In Step 902, a distance ($Z_L$) in Process Standard Deviations, is determined by subtracting the Process Mean (X) from the Process Lower Specification Limit (LSL) and dividing by the Process Standard Deviation (SD).

$$Z_L=(LSL-X)/SD$$

In Step 904, an area under Bell Curve ($A_L$) is determined from negative infinity ($-\infty$) to $Z_L$. In Step 906, an area under Bell Curve $A_U$ is determined from negative infinity ($-\infty$) to $Z_U$. In various disclosed embodiments, the area under Bell Curves $A_L$ and $A_U$ is determined by a table lookup or by a separate calculation. The table lookup may use an embedded Standard Normal Distribution Table to convert Z values (number standard deviations) to A values (area under bell curve). In other disclosed embodiments, the separate calculation may be performed by using calculations similar to those defined for Microsoft Excel's NORMDIST function. For standard bell curve areas, the formula requires 0 and 1 for the mean and standard deviation respectively.

$$A_L=NORMDIST(Z_L,0,1,TRUE).$$

$$A_U=NORMDIST(Z_U,0,1,TRUE).$$

In Step 908, a process grade, based on the difference in the Areas ($A_U-A_L$) is determined for each process using the following formula: Process Grade=AU−AL.

In Step 910, the process grade is stored in a database record.

Of course, those of skill in the art will recognize that, unless specifically indicated or required by the sequence of operations, certain steps in the processes described above may be omitted, performed concurrently or sequentially, or performed in a different order.

Figure 10:
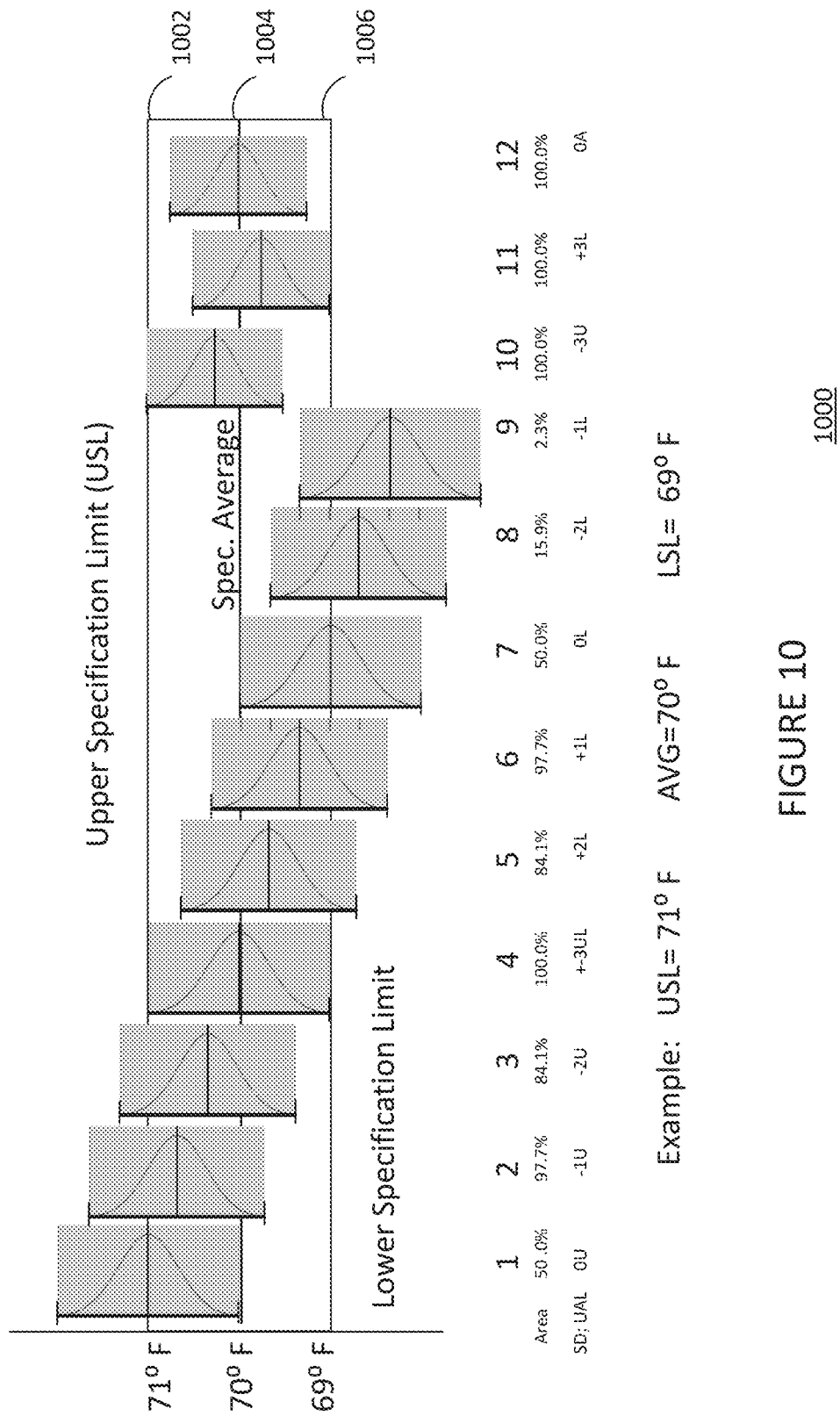
FIG. 10 illustrates a graph of a customer's process results.

FIG. 10 illustrates a graph of customer's process results generated in accordance with various embodiments of the present disclosure. As described previously, the graph consists of an upper specification limit (USL) 1002, a lower specification limit (LSL) 1006, and a customer desired or specification average 1004. The horizontal axis represents time (increasing from left to right) or successive sample values while the vertical axis is defined and annotated with the engineering units of the process (i.e. Degrees F.). The more area of a process bell curve that falls within the specified limits, the higher a grade that may be assigned to the process, as described previously. In this example, twelve separate processes bell curves are shown, each representing a separate process. Eight of the processes illustrate "out of range" behavior, with only 4, 10, 11, and 12 being fully contained within the specified limits. Typically the gray area with the bell curve is not shown and only the heavy vertical bar and the 2 horizontal bars at the vertical ends are shown.

FIG. 10 shows the relationship between process sample mean and its standard deviation to the Upper and Lower Specification Limits and the resulting grade. A fixed width Bell Curve is moved from Mean equal to the USL in 1 standard deviation steps downward until only 1 standard deviation of the bell curve is within the USL to LSL range (curves 1-9). The corresponding areas are shown below each bell curve.

FIG. 10 also shows three bell curves with a reduced standard deviation (shorter range) in positions 10-12 and positioned such that the entire bell curve is within the USL to LSL range. Grades for each of these bell curves (processes) would be 100%. However if these processes consistently showed 100%, it would be suggested to reduce the USL and LSL limits for that/those processes so that the tighten process limits reduce the likelihood of 100% grades. Note that any reduction in USL and LSL will immediately reduce the grades for curves 10 and 11, while curve 12 would need even tighter limits. Alternatively, "Extra Credit" could be given to those processes inside of USL and LSL by determining how much area there is outside the bell curve but inside USL to LSL using a slight modification to the process of FIG. 9 or by other calculation methods.

If one aggregate process has a significantly lower grade than others, the single process data that made up that aggregate grade can be used to find which process or processes is the root cause of the poor grade.

Figures 11A, 11B:
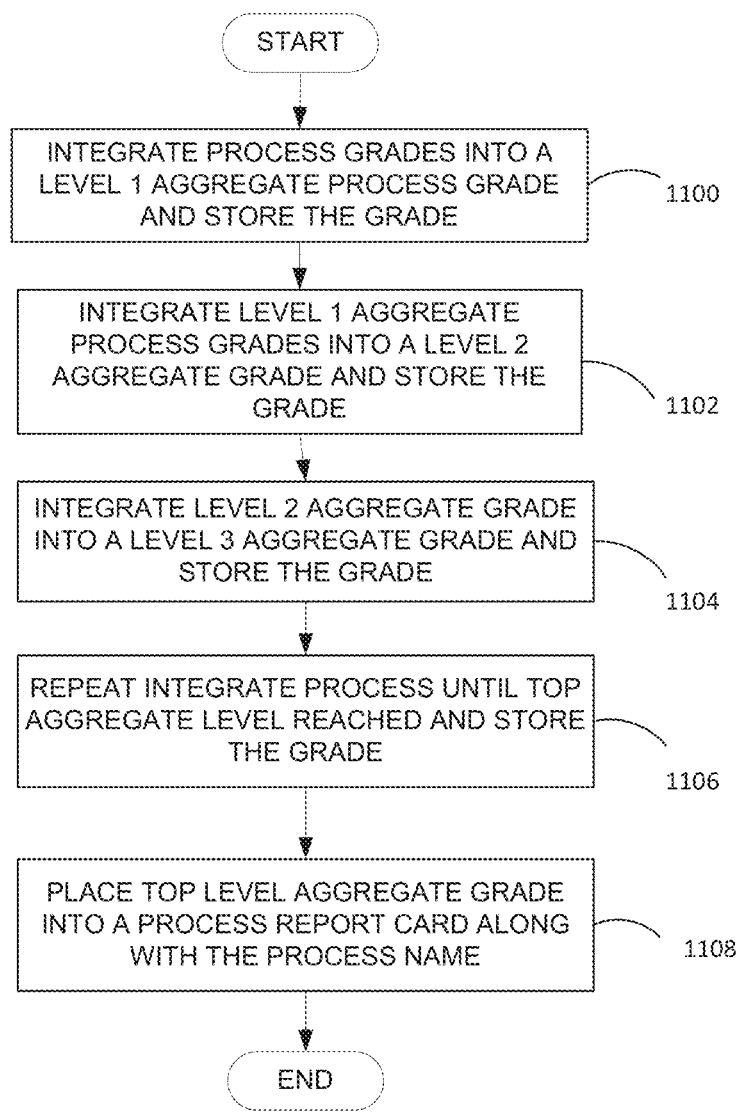
FIG. 11A depicts a flowchart of a process for generating a building report card.
FIG. 11B illustrates a sample report card.

FIG. 11A depicts a flowchart of a process for generating a building report card in accordance with various embodiments of the present disclosure. In various disclosed embodiments, a report card is generated by further aggregating currently or previously calculated process grades, such as described above in reference to FIG. 9.

In one embodiment, process grades are integrated into a Level 1 aggregate process grade. (Step 1100). To generate a level 1 aggregate process grade, in various embodiments of the disclosure, for each floor of a building, process grades are added across each row. The total of the process grades in each row is divided by the number of samples (or rooms) in each row. The average grade for each row is stored in a row aggregate process record. Each of the average grades in the row aggregate process record is considered a Level 1 aggregate process grade. See FIG. 6, where a depiction of a building setup suitable for generating process grades in this manner was previously described.

The process grades are then added across each column. The total of the process grades in each column is divided by the number of samples (or rooms) in each column. The average grade for each column is stored in a column aggregate process record. Each of the average grades in the column aggregate process record is also considered a Level 1 aggregate process grade. If there are multiple floors, the above process is duplicated for every floor in the building.

In Step 1102, the Level 1 aggregate process grades are integrated into a Level 2 aggregate grade. To generate the Level 2 aggregate grade, add all of the grades together for each floor for each of the Level 1 aggregate process grades from north to south, and divide by the number of samples. This "average of averages" results in an overall grade for those processes on each floor, and is referred to as the Level 2 aggregate grade. If there are multiple floors, the above process is repeated for each floor—resulting in Level 2 aggregate grades, which represent the aggregate process grades for each floor.

In Step 1104, the Level 2 aggregate grades are integrated into a Level 3 aggregate grade. The Level 3 aggregate grade is determined by adding together the aggregate floor grades of each floor (Level 2 aggregate grades) and dividing by the number of floors (samples) resulting in an aggregate grade for room temps in that building.

In Step 1106, if there are multiple buildings on a campus, the above process is repeated for each building, or until a top aggregate level is reached and a final grade is derived. In various disclosed embodiments, the process is repeated for each building on a campus, and an average of those building grades are created. If a customer has multiple campuses, the process may be repeated again to obtain a cross-campus aggregate grade. In other disclosed embodiments, only a single building is used, and Step 1106 will not result in additional calculations or aggregate grades.

In Step 1108, a single aggregated value goes into the report card as the grade for the process. A process name is placed on single lines along with an aggregate grade for the process. For each process that is being monitored, the above process will repeat using the data related to the various processes to generate a complete process report card. In various disclosed embodiments, generating a process report card may include storing, displaying, outputting to another process, or producing a hardcopy.

Upon completion of the report card, a user may review the process report card for good and/or bad grades. The process report card functions as an evaluation of system performance of building processes. The user will most likely focus on the worst grade. Once the report card has been generated, an action plan may now be determined. Now, a user may go back to individual campus grades for that process and determine the worst or few worst campuses for that process based on their grades (or worst building, floor, etc.). A user may repeat a downward inspection into the "aggregates of aggregates" looking for a process or processes that caused the overall grade to be diminished.

A user may focus on the lower performing processes to determine why they were sub-par. A determination may be made if a process upgrade is required or if there was another meaningful reason for bad grade. Follow up actions may include proposing one or more solutions to a customer, executing them after customer approval, and tracking process improvements. It should be realized that report cards could be built from any of the data in like interval levels of the database (FIG. 5), but in various disclosed embodiments, most report cards would be built up from monthly or quarterly interval levels.

FIG. 11B illustrates a sample report card 1110 in accordance with various embodiments of the present disclosure. The report card 1110 may be as simple as a list of the processes along with a percentage score associated with the process. Other variations on the report card layout are also envisioned and are within the scope of this disclosure.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 200 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by one or more data processing systems to evaluate system performance of building processes, the method comprising:
   generating, by a data processing system, process control chart data for a building process;
   generating a summary record of sample data from the control chart data;
   determining a process grade for each process using the summary record, including
      determining an upper distance, in process standard deviations, from a process mean to a process upper specification limit, determining a lower distance, in process standard deviations, from the process mean to a process lower specification limit, determining an area under a lower bell curve from negative infinity to the determined lower distance, determining an area under an upper bell curve from negative infinity to the determined upper distance, and determining the process grade by subtracting the area under the lower bell curve from the area under the upper bell curve; and generating a process report card including the determined process grade for each process.

2. The method of claim 1, wherein generating process control chart data comprises:

receiving attribute information and process data samples measuring a process in a building from a sensor or from a data record;

calculating, by the data processing system, a mean value for the received process data samples over a predetermined time interval;

calculating a standard deviation for each received process data samples;

calculating a grand mean of the sample mean values;

calculating a standard deviation mean using the calculated sample standard deviations; and generating a process control chart using the sample mean values, the grand mean, and the standard deviation mean.

3. The method of claim 2, wherein generating a summary record comprises:

receiving a "where used" database list for a process;

filtering, by the data processing system, the received process data samples to include the process data samples that have matching attributes in the "where used" database list; and generating a summary record including the filtered process data and calculations upon expiration of a time interval.

4. The method of claim 3, further comprising:

storing the generated summary record into a new data record for a next longer time interval.

5. The method of claim 3, wherein generating a summary record further comprises calculating one or more of a number of samples, minimum and maximum value, kurtosis, and skewness of the data samples and storing the one or more calculated values in the summary record.

6. The method of claim 2, further comprising generating a process bell curve using the calculated grand mean value of each process and the calculated standard deviation mean value to plot a bell curve for each process.

7. The method of claim 6, wherein determining a process grade comprises:

calculating a percentage of the process bell curve within an upper and lower specification limit, the upper and lower specification limits indicating performance specification limits; and storing the percentage as the process grade.

8. The method of claim 1 further comprising:

averaging similar grades into a single grade, wherein similar grades can be related to one of a same process at different times, like processes in a given interval, or like processes at different times.

9. The method of claim 1, further comprising:

analyzing the generated process report card to determine one or more processes needing improvement.

10. A data processing system comprising:

a storage device comprising a monitoring and reporting application;

an accessible memory comprising instructions of the monitoring and reporting application; and a processor configured to execute the instructions of the monitoring and reporting application to:

generate process control chart data for a building process;

generate a summary record of sample data from the control chart data;

determine a process grade for each process using the summary record, including determining an upper distance, in process standard deviations, from a process mean to a process upper specification limit, determining a lower distance, in process standard deviations, from the process mean to a process lower specification limit, determining an area under a lower bell curve from negative infinity to the determined lower distance, determining an area under an upper bell curve from negative infinity to the determined upper distance, and determining the process grade by subtracting the area under the lower bell curve from the area under the upper bell curve; and generate a process report card including the determined process grade for each process.

11. The data processing system in accordance with claim 10, wherein the processor, in generating control chart data, is further configured to:

receive attribute information and process data samples measuring a process in a building from a sensor or from a data record;

calculate a mean value for the received process data samples over a predetermined time interval;

calculate a standard deviation for each received process data samples;

calculate a grand mean of the sample mean values;

calculate a standard deviation mean using the calculated sample standard deviations; and generate a process control chart using the sample mean values, the grand mean, and the standard deviation mean.

12. The data processing system in accordance with claim 11, wherein the processor, in generating the summary record, is further configured to:

receive a "where used" database list for a process;

filter the received process data samples to include the process data samples that have matching attributes in the "where used" database list; and generate a summary record including the filtered process data and calculations upon expiration of a time interval.

13. The data processing system in accordance with claim 12, wherein the processor is further configured to:

store the generated summary record into a new data record for a next longer time interval.

14. The data processing system in accordance with claim 11, wherein the processor, in generating the summary record, is further configured to:

calculate one or more of a number of samples, minimum and maximum value, kurtosis, and skewness of the data samples and storing the one or more calculated values in the summary record.

15. The data processing system in accordance with claim 11, wherein the processor, in generating the process bell curve, is further configured to:

generate the process bell curve using the calculated grand mean value of each process and the calculated standard deviation mean value to plot a bell curve for each process.

16. The data processing system in accordance with claim 15, wherein the processor, in determining the process grade, is further configured to:
calculate a percentage of the process bell curve within an upper and lower specification limit, the upper and lower specification limits indicating performance specification limits; and
store the percentage as the process grade.

17. The data processing system in accordance with claim 10, wherein the processor is further configured to:
average similar grades into a single grade, wherein similar grades can be related to one of a same process at different times, like processes at the same time, or like processes at different times.

18. The data processing system in accordance with claim 10, wherein the processor is further configured to:
analyze the generated process report card to determining one or more processes needing improvement.

\* \* \* \* \*